(12) United States Patent
Sandeep et al.

(10) Patent No.: US 9,326,004 B2
(45) Date of Patent: Apr. 26, 2016

(54) REDUCED MEMORY MODE VIDEO DECODE

(75) Inventors: Bhatia Sandeep, Bangalore (IN); Jason Demas, Irvine, CA (US); Subramanian M. K. Kuppuswamy, Bangalore (IN); Bhaskar Mala Sherigar, Bangalore (IN); Parijat Gupta, Bangalore (IN); Darren Neuman, Palo Alto, CA (US); Ramakrishnan Lakshman, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 2267 days.

(21) Appl. No.: 12/132,208

(22) Filed: Jun. 3, 2008

(65) Prior Publication Data

US 2009/0296822 A1     Dec. 3, 2009

(51) Int. Cl.
| | |
|---|---|
| *H04N 19/59* | (2014.01) |
| *H04N 19/61* | (2014.01) |
| *H04N 19/44* | (2014.01) |
| *H04N 19/82* | (2014.01) |
| *H04N 19/85* | (2014.01) |

(52) U.S. Cl.
CPC .............. *H04N 19/59* (2014.11); *H04N 19/44* (2014.11); *H04N 19/61* (2014.11); *H04N 19/82* (2014.11); *H04N 19/85* (2014.11)

(58) Field of Classification Search
None
See application file for complete search history.

(56) References Cited

U.S. PATENT DOCUMENTS

| | | | |
|---|---|---|---|
| 5,488,419 A * | 1/1996 | Hui et al. ................. | 375/240.17 |
| 5,535,013 A | 7/1996 | Murata | |
| 5,638,128 A * | 6/1997 | Hoogenboom et al. . | 375/240.15 |
| 5,805,227 A * | 9/1998 | Gi-Hwan ................. | 375/240.17 |
| 6,256,348 B1 * | 7/2001 | Laczko et al. ........... | 375/240.15 |
| 6,295,089 B1 * | 9/2001 | Hoang ...................... | 348/390.1 |
| 6,307,962 B1 | 10/2001 | Parker et al. | |
| 6,396,876 B1 | 5/2002 | Babonneau et al. | |
| 6,724,822 B1 * | 4/2004 | Bi et al. ................... | 375/240.17 |
| 6,985,635 B2 * | 1/2006 | Chen et al. ..................... | 382/250 |
| 6,993,185 B2 | 1/2006 | Guo et al. | |
| 7,339,992 B2 | 3/2008 | Chang et al. | |
| 7,920,628 B2 | 4/2011 | Kojokaro et al. | |
| 7,941,006 B2 * | 5/2011 | Fuchigami .................... | 382/300 |
| 8,064,516 B2 | 11/2011 | Kojokaro et al. | |
| 2002/0075959 A1 * | 6/2002 | Dantwala ................. | 375/240.16 |
| 2002/0150159 A1 * | 10/2002 | Zhong ...................... | 375/240.16 |

(Continued)

OTHER PUBLICATIONS

*Information Technology—Generic Coding of Moving Pictures and Associated Audio*, Recommendation H.262, ISO/IEC 13818-2, Draft International Standard, pp. i-vii and 1-202 (Mar. 25, 1994).

(Continued)

*Primary Examiner* — Gregory Sefcheck
(74) *Attorney, Agent, or Firm* — Sterne, Kessler, Goldstein & Fox PLLC

(57) ABSTRACT

A method and system to decode a video stream are provided. The method comprises receiving macroblocks, filtering and decimating the macroblocks to create decimated macroblocks and storing the decimated macroblocks. The method further comprises creating a decimated reference block from one or more decimated macroblocks of a decimated reference picture and interpolating selected pixels of the decimated reference block to create an interpolated reference block. The method further comprises pre-processing selected columns of the interpolated reference block to create a processed reference block for motion compensation.

23 Claims, 10 Drawing Sheets

(56) References Cited

U.S. PATENT DOCUMENTS

| | | | |
|---|---|---|---|
| 2002/0181583 | A1 | 12/2002 | Corbera |
| 2005/0013500 | A1 | 1/2005 | Lee et al. |
| 2005/0047502 | A1* | 3/2005 | McGowan ............... 375/240.01 |
| 2006/0062454 | A1 | 3/2006 | Fan et al. |
| 2007/0230572 | A1* | 10/2007 | Koto et al. ............... 375/240.12 |
| 2008/0198934 | A1* | 8/2008 | Hong et al. .............. 375/240.22 |

OTHER PUBLICATIONS

*Information Technology—Generic Coding of Moving Pictures and Associated Audio Information: Video,* Recommendation ITU-T H.262 (1995 E), ISO/IEC 13818-2: 1995 (E), Draft International Standard, pp. i-xi and 1-243 (1995).

Crandall et al., "Extraction of Special Effects Caption Text Events from Digital Video", International Journal on Document Analysis and Recognition, 2003, vol. 5, pp. 138-157.

Gargi et al., "A System for Automatic Text Detection Video", IEEE International Conference on Document Analysis and Recognition, 1999, pp. 20-22.

Jung et al., "Text Information Extraction in Image and Video: A Survey", The Journal of Pattern Recognition Society, 2004, pp. 978-997.

Lienhart, "Automatic Text Recognition for Video Indexing", ACM Multimedia 96, pp. 11-21.

Zhong at al., "Automatic Caption Localization in Compressed Video", III Trans. on Pattern Analysis and Machine Intelligence, vol. 22, No. 4, 2000.

* cited by examiner

REDUCED MEMORY MODE VIDEO DECODE

BACKGROUND OF THE INVENTION

1. Field of the Invention

This invention generally relates to video decoding and more specifically to reducing memory requirements during decoding.

2. Background Art

A visual information source requires a transmission or a storage medium to convey its message to the observer. The fidelity of transmission and reproduction of the message is closely related to and dependent on the available medium capacity and the manner in which it is used. Storage medium capacity is typically expressed in bits per second or a bit rate. The amount of storage required for digital media can be reduced by compressing the video signal. Digital video compression is used to represent an image with as low a bit rate as possible while preserving an appropriate level of picture quality for a given application. Compression is achieved by identifying and removing redundancies in digital media. A bit rate reduction system operates by removing redundant information from the signal at the encoder prior to transmission and re-inserting it at the decoder. An encoder and decoder pair are referred to as a 'codec'.

At its most basic level, compression is performed when an input video stream is analyzed and information that is indiscernible to the viewer is discarded. Each event is then assigned a code where commonly occurring events are assigned fewer bits and rare events are assigned more bits. These steps are commonly referred to as signal analysis, quantization and variable length encoding. Common methods for encoding or compression include discrete cosine transform (DCT), vector quantization (VQ), fractal compression, and discrete wavelet transform (DWT). Methods for decoding or decompression are typically the inverse of the methods used for encoding. However, full-resolution decoding is memory intensive requiring significant storage resources along with extensive data transfer bandwidth. Method and systems are needed to overcome the above deficiencies.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

Table of Contents

I. Introduction
II. MPEG-2 Compression
   II. a) MPEG-2 data structure
   II. b) MPEG-2 Encoder
   II. c) MPEG-2 Decoder
III. Example Embodiments
   III. a) Modified MPEG-2 Decoder
   III. b) Filtering and Decimation Unit
   III. c) Pixel Interpolation Unit
   III. d) Conditional Pre-processing unit
   III. e) Example Method
   III. f) Example Computer System
   III. g) Example System on Chip
IV. Conclusion

I. Introduction

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The present invention will be described in terms of an embodiment applicable to reduction of storage and memory bandwidth requirements during a video decode process. It will be understood that the essential concepts disclosed herein are applicable to a wide range of compression standards, codecs, electronic systems, architectures and hardware elements. Thus, although the invention will be disclosed and described in terms of filtering, interpolating and pre-processing of partially decoded video from an MPEG-2 video elementary stream using an exemplary decoder, the invention is not limited to these embodiments.

As used herein, the terms "image" and "picture" and the plural form of these terms are used interchangeably throughout this document and are used to denote individual images that comprise a video stream as is apparent to a person skilled in the relevant art(s).

The example embodiments presented herein are described in relation to video compression. The invention however, is not limited to these example embodiments, coding standards or video compression. Based on the description herein, a person skilled in the relevant art(s) will understand that the invention can be applied to other applications and a wide variety of image/video standards and compression formats.

II. MPEG-2 Compression

The MPEG-2 codec uses a combination of lossless and lossy compression techniques to reduce the bit rate of a video stream. MPEG-2 is an extension of the MPEG-1 international standard for digital compression of audio and video signals. MPEG-2 efficiently compresses video and scales to HDTV resolutions and bit rates. MPEG-2 provides algorithmic tools for efficiently coding video, supports a wide range of bit rates and provides for multi-channel surround sound coding. An example sequence of MPEG-2 is further described below.

II. a) MPEG-2 sequence

Figure 1:
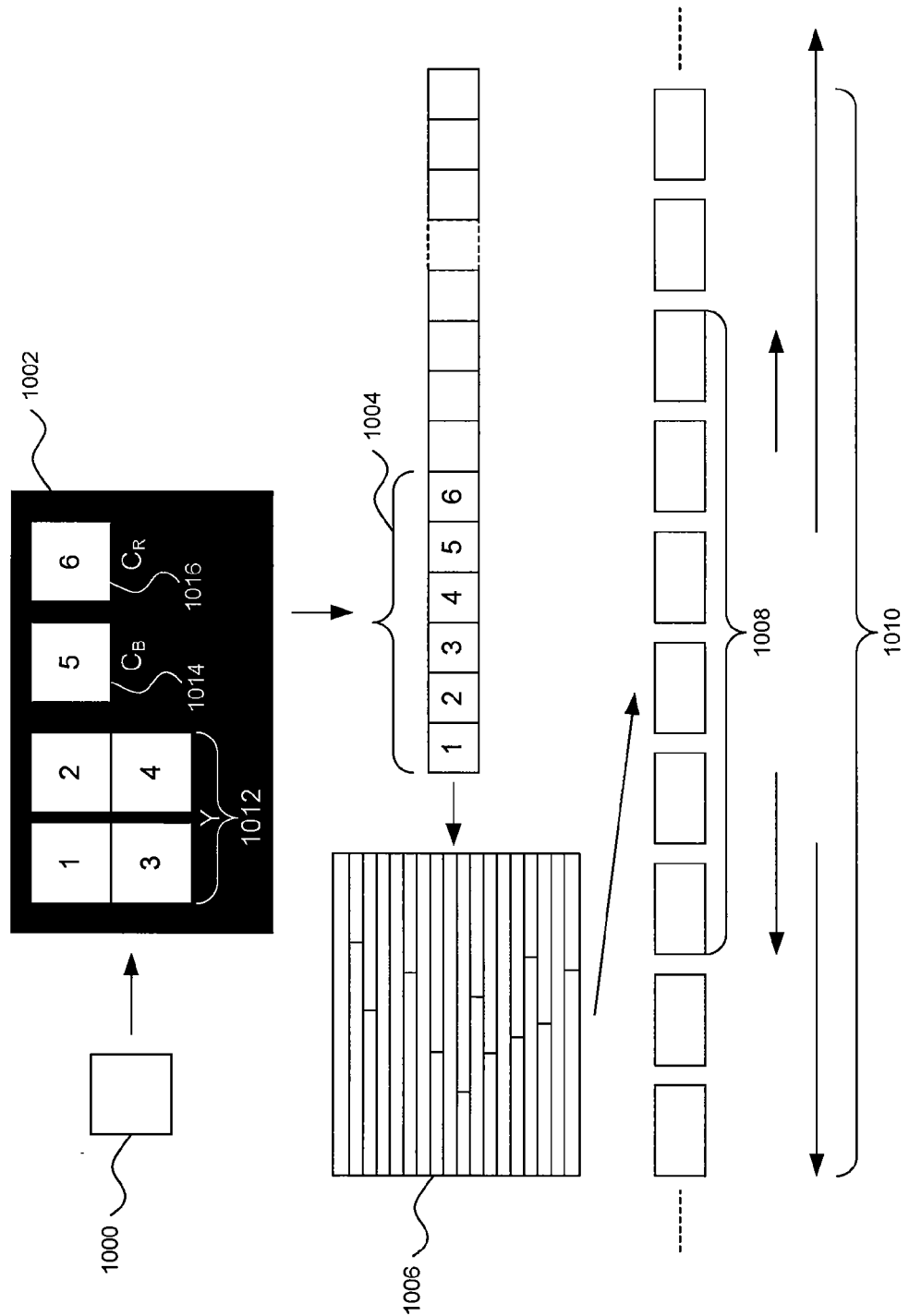
FIG. 1 illustrates an MPEG-2 video sequence.

FIG. 1 illustrates the composition of a 4:2:0 MPEG-2 video sequence 1010. The MPEG-2 data structure is made up of six hierarchical layers. These layers are the block 1000, macroblock 1002, slice 1004, picture 1006, group of pictures (GOP) 1008 and the video sequence 1010.

Luminance and chrominance data of an image in the 4:2:0 format of a MPEG-2 video stream are separated into macroblocks that each consist of four luma (Y) blocks 1012 of 8×8 pixel values in a window of 16×16 pixels of the original picture and their associated color difference blue chroma ($C_B$) block 1014 and red chroma ($C_R$) block 1016. The number of chroma blocks in the macroblock depends on the sampling structure (e.g., 4:4:4, 4:2:2 or 4:2:0). Profile information in the sequence header selects one of the three chroma formats. In the 4:2:0 format as shown in FIG. 1, a macroblock consists of 4 Y blocks 1012, 1 $C_B$ block 1014 and 1 $C_R$ block 1016. In the 4:2:2 format a macroblock consists of 4 Y blocks, 2 $C_R$ blocks and 2 $C_B$ blocks. In the 4:4:4 format a macroblock consists of 4 Y blocks, 4 $C_R$ blocks and 4 $C_B$ blocks.

The slice 1004 is made up of a number of contiguous macroblocks. The order of macroblocks within a slice 1004 is the same as that in a conventional television scan: from left to right and from top to bottom. The picture 1006 is the primary coding unit in the video sequence 1010. The picture 1006 consists of a group of slices 1004 that constitute the actual picture area. The picture 1006 also contains information needed by the decoder such as the type of image (I, P or B) and the transmission order. Header values indicating the position of the macroblock 1002 within the picture 1006 may be used to code each block. There are three picture 1006 types in the MPEG-2 codec:

a. 'Intra' pictures (I-pictures) are coded without reference to other pictures. Moderate compression is achieved by reducing spatial redundancy, but not temporal redundancy. They can be used periodically to provide access points in the bit stream where decoding can begin.

b. 'Predictive' pictures (P-pictures) can use the previous I or P-picture for motion compensation and may be used as a reference for further prediction. Each block in a P-picture can either be predicted or intra-coded. By reducing spatial and temporal redundancy, P-pictures offer increased compression compared to I-pictures.

c. 'Bidirectionally-predictive' pictures (B-pictures) can use the previous and next I or P-pictures for motion-compensation, and offer the highest degree of compression. Each block in a B-picture can be forward, backward or bidirectionally predicted or intra-coded. To enable backward prediction from a future frame, the encoder reorders the pictures from their natural display order to a bit stream or decode order so that the B-picture is transmitted after the previous and next pictures it references. This introduces a reordering delay dependent on the number of consecutive B-pictures.

The GOP 1008 is made up of a sequence of various combinations of I, P and B pictures. It usually starts with an I picture which provides the reference for following P and B pictures and identifies the point for switching and tape editing. Pictures are encoded and decoded in decode order which is typically different from the order in which they are displayed. This is due to the use of bidirectional prediction for B pictures.

Source order and encoder input order for a GOP 1008 may be:

I(1) B(2) B(3) P(4) B(5) B(6) P(7) B(8) B(9) P(10) B(11) B(12) I(13)

Encoding order and order in the coded bit stream for a GOP 1008 may be:

I(1) P(4) B(2) B(3) P(7) B(5) B(6) P(10) B(8) B(9) I(13) B(11) B(12)

Display order is the same as the encoder input order:

I(1) B(2) B(3) P(4) B(5) B(6) P(7) B(8) B(9) P(10) B(11) B(12) I(13)

The video sequence 1010 includes a sequence header, one or more GOPs 1008, and an end-of-sequence code. The header contains information about the picture. The encoded video sequence 1010 is also known as the video elementary stream.

II. b) MPEG-2 Encoder

An MPEG-2 encoder removes spatial redundancy in a video stream through motion estimation and transform codes a residue resulting from motion estimation. The encoder also performs entropic coding of motion data in a video stream. For example, the MPEG-2 encoder performs a discrete cosine transform on a residue resulting from motion estimation. The numerical precision of the DCT coefficients are reduced while maintaining good image quality at the decoder. An encoder achieves this by using quantization to reduce the number of possible values to be transmitted thereby reducing the required number of bits. The 'quantizer level', 'quantization level' or 'degree of quantization' determines the number of bits assigned to a DCT coefficient of a macroblock. The quantization level applied to each coefficient is weighted according to the visibility of the resulting quantization noise to a human observer. This results in high-frequency coefficients being more coarsely quantized than low-frequency coefficients. The quantization noise introduced by an encoder is typically not reversible in the decoder, making the coding and decoding process lossy. The quantized video stream is variable length coded to generate a coded bit stream.

II. c) MPEG-2 Decoder

Figure 2:
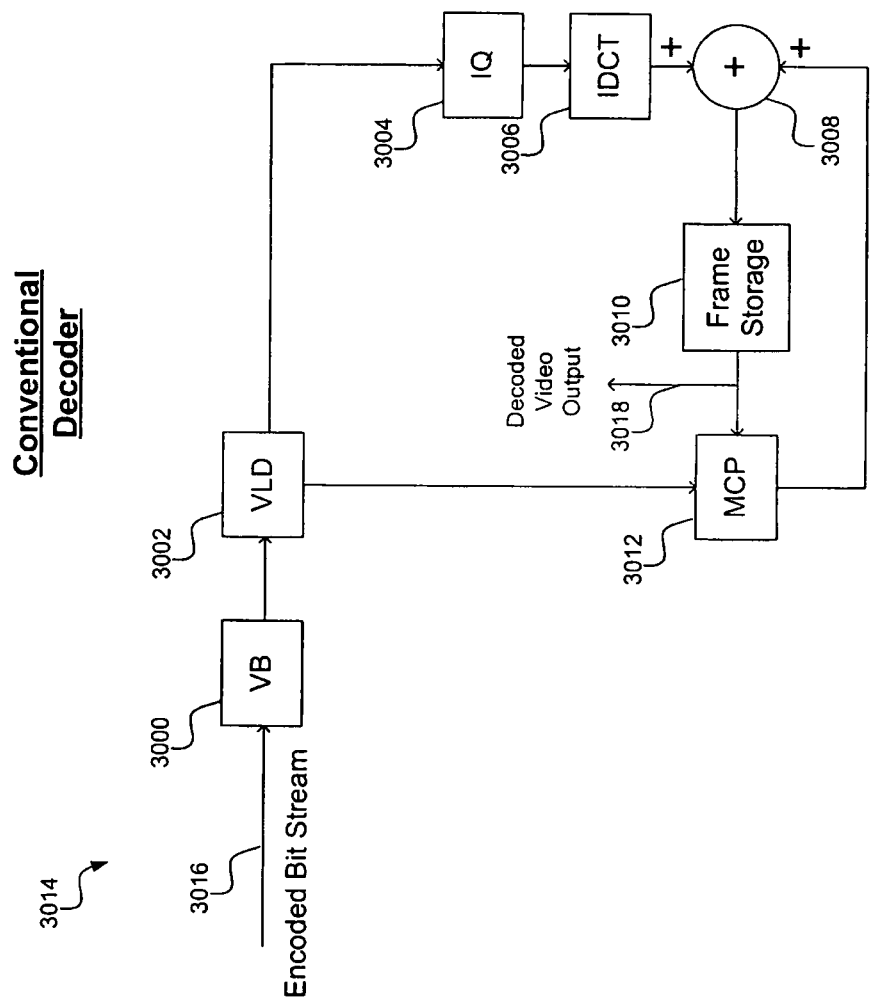
FIG. 2 is a block diagram of a conventional MPEG-2 decoder.

FIG. 2 is a block diagram of a conventional MPEG-2 decoder 3014. The decoder 3014 includes a video buffer (VB) 3000, a variable length decoder (VLD) 3002, an inverse quantizer (IQ) unit 3004, an inverse DCT (IDCT) unit 3006, an adder 3008, a frame storage unit 3010 and a motion compensation (MCP) unit 3012.

The decoding process is the reverse of the encoding process. Coded bit stream 3016 from an encoder is received by decoder 3014 at video buffer 3000 and variable length decoded by variable length decoder 3002. Motion vectors are parsed from the data stream and fed to the motion compensation unit 3012. Quantized DCT coefficients are fed to the inverse quantizer unit 3004 and then to the inverse DCT unit 3006 that transforms the coefficients into a spatial domain. For P and B pictures, motion vector data is translated to a memory address by the motion compensation unit 3012 to read a particular reference block out of a reference picture previously stored in frame storage unit 3010. The adder 3008 adds this prediction to residual data from inverse discrete cosine transform unit 3006 to form decoded video output 3018. For I pictures, there are no motion vectors and no reference pictures, so the prediction is forced to zero. For I and P pictures, the adder 3008 output is fed back to be stored as a reference picture in the frame storage unit 3010 for future predictions.

III. Example Functions, Abbreviations and Symbols

Example functions, abbreviations and symbols below are used in algorithms described herein:

|| indicates a logical "OR" function.
&& indicates a logical "AND" function.
! indicates a logical "NOT" function.
== indicates "equal to."
!= indicates a logical "not equal to."
= is an assignment operator.
ceiling(x) returns the smallest integer greater than or equal to x.
floor(x) returns the greatest integer less than or equal to x.
int(x) returns the integer part of x.
round(x) returns int(x+0.5).
DIV(x) performs integer division with truncation of the result toward minus infinity.
m×n indicates a 2-dimensional array of m columns and n rows.

It is to be appreciated that these symbols and abbreviations used herein are a design choice and may be arbitrary.

III. Example Embodiments

III. a). Reduced Memory Mode Decoder

Figure 3:
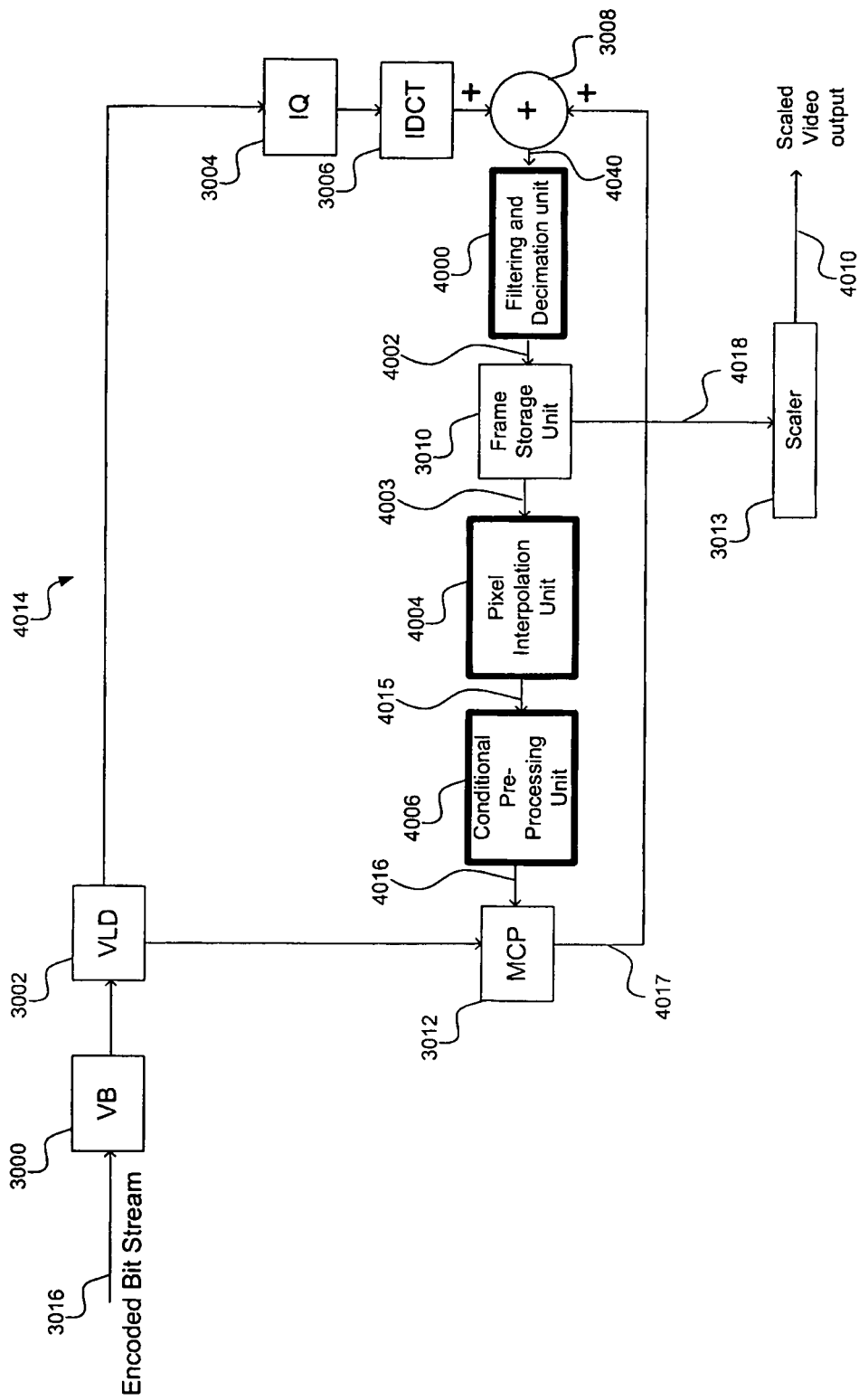
FIG. 3 is a block diagram of an MPEG-2 decoder according to an embodiment of the invention.

FIG. 3 illustrates a reduced memory mode decoder 4014 according to an embodiment of the invention. Decoder 4014 comprises video buffer (VB) 3000, variable length decoder (VLD) 3002, inverse quantization (IQ) unit 3004, inverse discrete cosine transform unit (IDCT) 3006, adder 3008, filtering and decimation unit 4000, frame storage unit 3010, scaler 3013, pixel interpolation unit 4004, conditional pre-processing unit 4006 and motion compensation unit 3012. Filtering and decimation unit 4000 is coupled to adder 3008 and frame storage unit 3010. Pixel interpolation unit 4004 is coupled to frame storage unit 3010, conditional pre-processing unit 4006 and scaler 3013. Conditional pre-processing unit 4006 is coupled to pixel interpolation unit 4004 and motion compensation unit 3012.

According to an embodiment of the invention, filtering and decimation unit 4000 is configured to filter and decimate a macroblock 4040 into a decimated macroblock 4002. The decimated macroblock 4002 is stored in frame storage unit 3010. Filtering and decimation unit 4000 may be a spatial two-tap low-pass filter. Filtering and decimation unit 4000 decimates each macroblock 4040 in either the horizontal dimension, vertical dimension or both horizontal and vertical dimensions. Decimated macroblock 4002 requires less amount of storage space in frame storage unit 3010 as compared to the amount of storage space required for storing macroblock 4002 by conventional decoder 3014. It is to be appreciated that the type of filtering and the percentage of decimation is a design choice and may be arbitrary. An example embodiment of filtering and decimation unit 4000 is described below with reference to FIG. 4. After filtering and decimation by filtering and decimation unit 4000 is accomplished for all macroblocks of a picture then we have a decoded and decimated picture in frame storage unit 3010 ready for display, or ready to be used as a reference picture for motion compensation for inter-coded/predictively coded macroblocks of future pictures in the video stream. The process of using a decoded and decimated picture in frame storage unit 3010 as a reference picture for motion compensation for inter-coded macroblocks of future pictures in the video stream is described below.

Output of VLD 3002 determines whether a current macroblock being processed by decoder 4014 is an inter-coded macroblock. Inter-coded or predictively encoded macroblocks are P or B macroblocks. If the current macroblock is an inter-coded macroblock then, pixel interpolation unit 4004 is configured to fetch a decimated reference block 4003 comprising whole or part(s) of one or more decimated macroblocks 4002 of a previously decoded and decimated reference picture stored in frame storage unit 3010. Pixel interpolation unit 4004 is configured to interpolate pixels of the decimated reference block 4003 and generate an interpolated reference block 4015 which has a size greater than that of the decimated reference block 4003. An example embodiment of a pixel interpolation unit 4004 is described in further detail below with reference to FIG. 5. The interpolated reference block 4015 generated by pixel interpolation unit 4004 may be conditionally pre-processed by conditional pre-processing unit 4006.

Conditional pre-processing unit 4006 is configured to select columns of the interpolated reference block 4015 for pre-processing prior to motion compensation by motion compensation unit 3012. In an embodiment, conditional pre-processing unit is configured to determine whether the first and/or last columns of interpolated reference block 4015 are to be pre-processed. Conditions used by conditional pre-processing unit 4006 to select and pre-process the selected columns of interpolated reference block 4015 are described in further detail below with reference to FIG. 6. Conditional pre-processing unit 4006 pre-processes the selected columns of interpolated reference block 4015 to create processed reference block 4016. Processed reference block 4016 is used by motion compensation unit 3012 for generating the final reference block 4012 which is fed back to adder 3008 which adds a corresponding output of IDCT 3006 to generate a decoded macroblock which is then filtered and decimated by filtering and decimation unit 4000 and stored back into frame storage unit 3010.

Scaler 3013 retrieves decimated pictures from frame storage unit 3010. Scaler 3013 is configured to upscale the decimated video output 4018 by the same scale by which filtering and decimation unit 4000 decimated macroblocks 4040 so as to generate final decoded video output 4010. For example, if filtering and decimation unit 4000 decimates macroblocks horizontally by a scale of two, then scaler 3013 upscales the decimated video output 4018 horizontally by a scale of two to generate final decoded video output 4010.

III. b). Filtering and Decimation Unit

Figure 4:
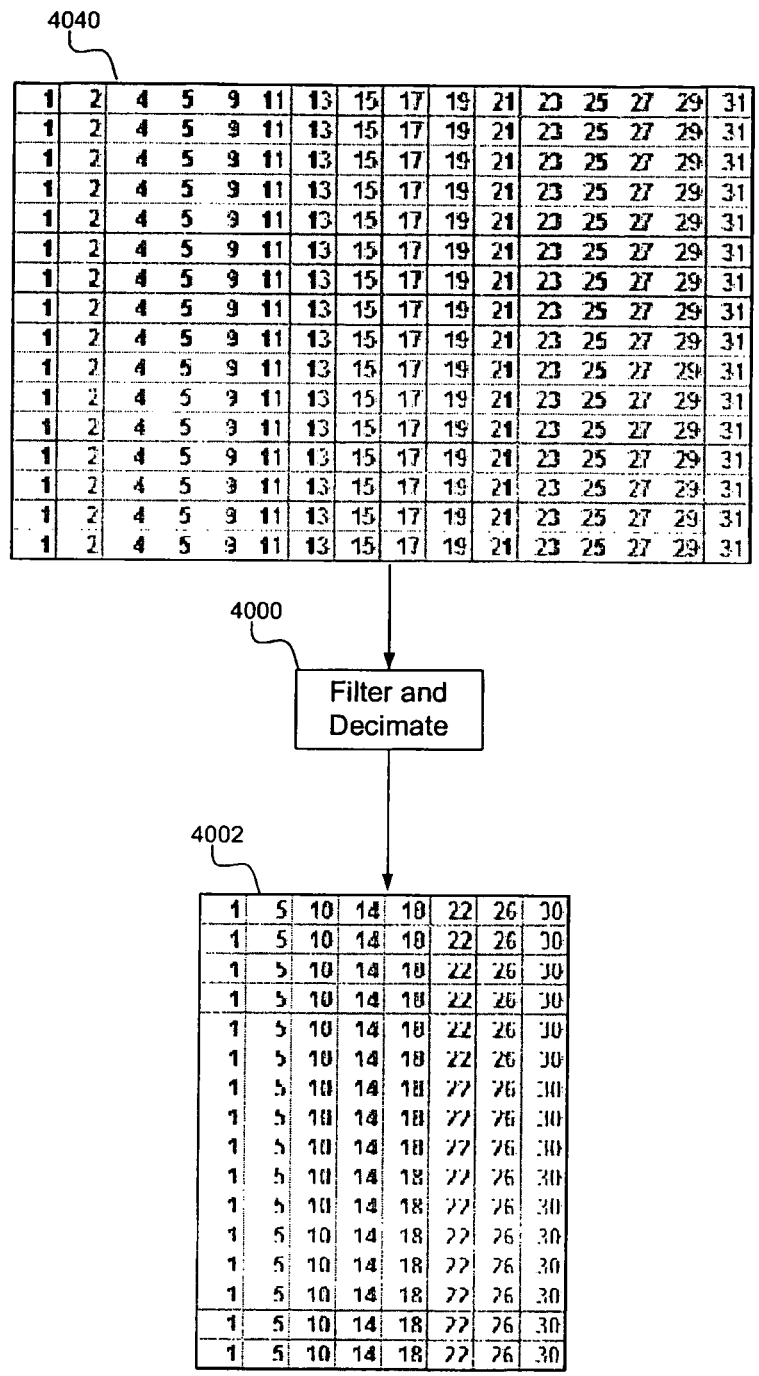
FIG. 4 illustrates a filtering and decimation according to an embodiment of the invention.

FIG. 4 illustrates an embodiment of filtering and decimation unit 4000. Filtering and decimation unit 4000 is configured to process macroblock 4040 to generate a decimated macroblock 4002. Filtering and decimation unit 4000 performs horizontal decimation of macroblock 4040 by a factor of two. In the present example, macroblock 4040 is in 4:2:0 format and has 16 columns for luma and 8 columns for chroma. Macroblock 4040 is horizontally decimated by a factor of 2 by filtering and decimation unit 4000 to 8 columns for luma and 4 columns for chroma in macroblock 4002. Below is an example algorithm to horizontally decimate a macroblock by a scale of two:

```
For ( 0 ≤ i ≤ H & 0 ≤ j ≤ W/2 )
{
  If int ( ( x [ i, 2j ] + x [ i, 2j + 1 ] ) / 2 ) is even then
    y [ a + i, b/2 + j ] = ceiling ( ( x [ i, 2j ] + x [ i, 2j + 1 ] ) / 2 ) else
    y [ a + i, b/2 + j ] = floor ( ( x [ i, 2j ] + x [ i, 2j + 1 ] ) / 2 )
}
```

"y" is a picture buffer in frame storage unit that stores all decimated macroblocks 4002 of a picture. "a" and "b" are the $a^{th}$ row and $b^{th}$ column respectively of a picture where the top-left pixel of macroblock 4040 is located. "x" is a temporary buffer in memory in which the macroblock 4040 is stored. "i" and "j" denote the $i^{th}$ row & $j^{th}$ column, respectively, of decimated macroblock 4040 with $0 \le m \le H$ and 0≤n≤W. "H" is height and "W" is width of macroblock 4040. H and W are 16 if macroblock 4040 is a luma macroblock with a 4:2:0 encoding. H and W are 8 if macroblock 4040 is a chroma macroblock.

Filtering and decimation unit 4000 processes luma and chroma macroblocks in an identical fashion. In alternate embodiments one or both of width and height of one or both of luma and chroma macroblocks 4040 may be decimated. The percentage of decimation is a design choice and may be arbitrary as will be understood by an artisan of skill in the art.

III. c). Pixel Interpolation Unit

Figure 5:
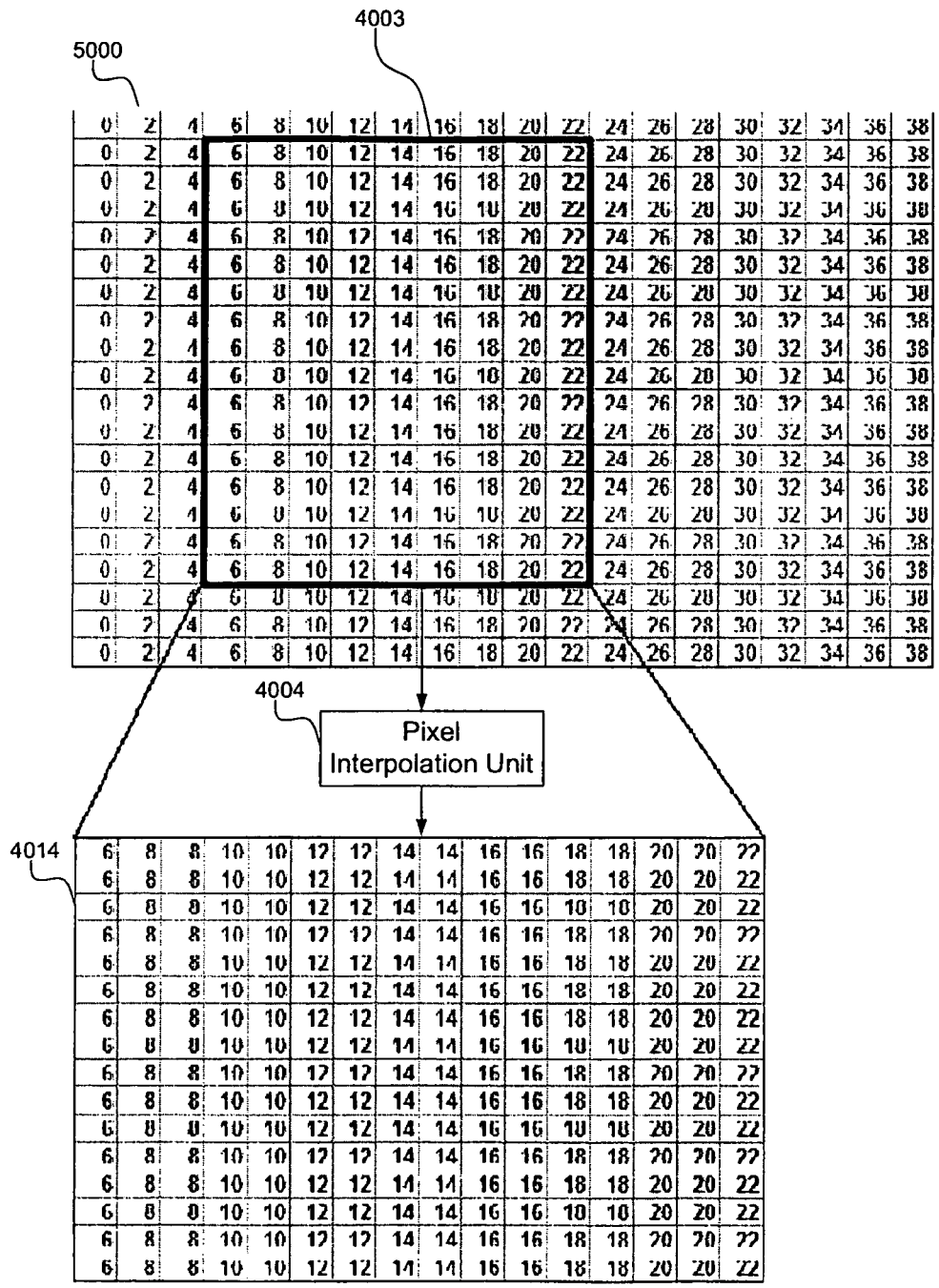
FIG. 5 illustrates pixel duplication according to an embodiment of the invention.

FIG. 5 illustrates pixel interpolation unit 4004 according to an embodiment of the invention. Pixel interpolation unit 4004 is configured to fetch a decimated reference block 4003 from a decimated picture 5000 stored in frame storage 3010 and interpolate decimated reference block 4003 to generate interpolated reference block 4015.

The output of VLD 3002 determines whether a current macroblock being decoded by decoder 4014 is an inter-coded macroblock. If the current macroblock is a predictively encoded or inter-coded macroblock and if decimated reference picture 5000 is referenced by the current macroblock, pixel interpolation unit 4004 fetches decimated reference block 4003 from decimated reference picture 5000 in frame storage unit and interpolates decimated reference block 4003 to generate interpolated reference block 4015. Decimated picture 5000 is comprised of multiple decimated macroblocks 4002 stored in frame storage 3010 and hence decimated reference block 4003 will comprise whole or part(s) of one or more decimated macroblocks 4002 of decimated picture 5000 in frame storage 3010. Example sample motion vector "int_vec[t]" and half sample flag "half_flag[t]" are used to interpolate decimated reference block 4003. For each prediction, integer sample motion vectors int_vec[t] and the half sample flags half_flag[t] are formed based on vector[r][s][t] as defined in the MPEG-2 specification as follows:

```
for (t=0; t<2; t++)
{
    int_vec[t] = vector[r][s][t] DIV 2;
    if ((vector[r][s][t] - (2 * int_vec[t]) != 0)
    half_flag[t] = 1; else
    half_flag[t] = 0;
}
```

Int_vec[t], vector[r][s][t] and half_flag[t] are each defined in the MPEG-2 specification.

The algorithm described below is given as an example and can be used by pixel interpolation unit 4004 to interpolate decimated reference block 4003 and generate interpolated reference block 4015:

```
i = int_vec [ 1 ] + k and j = int_vec [ 0 ] + 1
For all rows m = 0 to h – 1 {
    For all columns n = 0 to w – 1 do {
        ref [ m, n ] = ref_DRAM [ i + m, int ( ( j + n ) / 2 ) ] }}
```

"ref" is a temporary buffer to hold interpolated reference block 4015, "ref dram" is a picture buffer storing decimated reference picture 5000. "k" and "l" are the $k^{th}$ row and $l^{th}$ column in the current picture (being decoded by the decoder) where the top-left pixel of current macroblock (being decoded by the decoder) is located and m, n are the $m^{th}$ row and $n^{th}$ column of interpolated reference block 4015. In the present example, decimated reference picture 5000 extends heightwise from row 0 to 19 and widthwise from column 0 to 19. In this example, i=1, j=7, half_flag[0]=0, half_flag[1]. The decimated reference block 4003 culled from decimated reference picture 5000 starts from row 1 and column 3 of picture 5000. Decimated reference block 4003 has 9 rows and 16 columns. A two-dimensional temporary buffer in memory (not shown) that stores interpolated reference block 4015 has a size of at least w×h. The values of w and h are given by:

```
If ( half_flag [ 0 ] = = 0 ) then w = W else w = W + 1.
If ( half_flag [ 1 ] = = 0 ) then h = H else h = H + 1.
```

In this example, W=H=16 for luma macroblocks and W=H=8 for chroma macroblocks in a 4:2:0 encoding format.

III. d). Conditional Pre-Processing Unit

Figure 6:
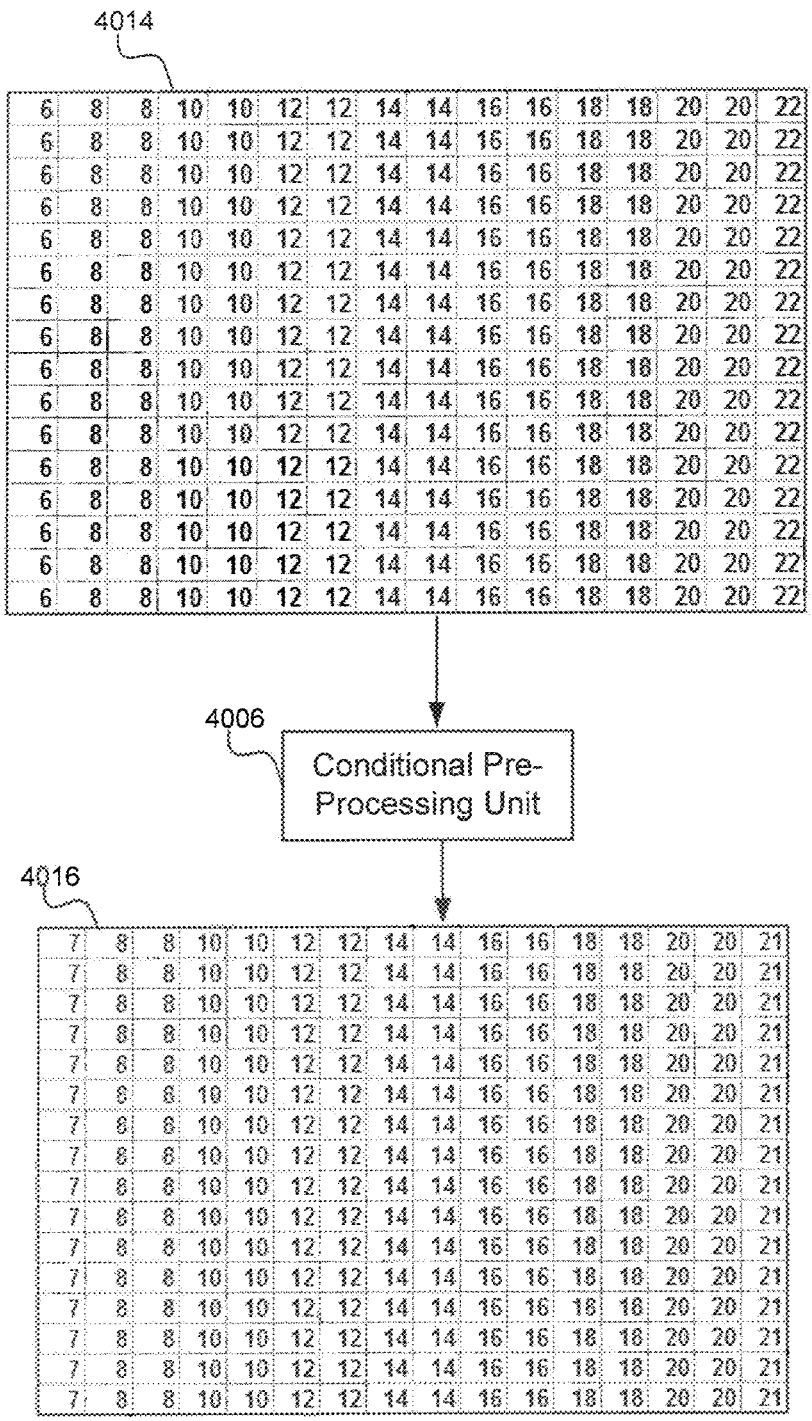
FIG. 6 illustrates conditional pre-processing according to an embodiment of the invention.

FIG. 6 illustrates conditional pre-processing unit 4006 according to an embodiment of the invention. Conditional pre-processing unit 4006 is configured to selectively pre-process columns of interpolated reference block 4015 to generate processed reference block 4016 to be used by motion compensation unit 3012 to generate a final reference block 4012 for adder 3008. In an embodiment, only the first and last columns of interpolated reference block 4015 may be pre-processed by conditional pre-processing unit 4004.

The conditional pre-processing unit 4006 is configured to pre-process a first column of the interpolated reference block 4015 if a value obtained by dividing horizontal component of motion vector associated with the current macroblock being decoded by the decoder by two and truncating the result towards negative infinity results in an odd number. If the first column of the interpolated reference block 4015 is to be pre-processed then the conditional pre-processing unit 4006 is configured to average pixel values in the first column of the interpolated reference block 4015 with corresponding pixel values in the second column of the interpolated reference block 4015 and store the average back in a corresponding location in the first column of the interpolated reference block 4015. Example pseudo-code for conditionally pre-processing the first column of interpolated reference block 4015 is provided below:

```
If ( int_vec [ 0 ] is odd )
{
    For all rows m = 0 to h – 1
    {
        ref [ m, 0 ] = round ( ( ref [ m, 0 ] + ref [ m, 1 ] ) / 2 )
    }
}
```

"ref" is a buffer that holds interpolated reference block 4015 before pre-processing and processed ref block after pre-processing and m is the $m^{th}$ row of interpolated reference block 4015.

In an embodiment, the conditional pre-processing unit 4006 is configured to pre-process a last column of the interpolated reference block 4015 if a value obtained by dividing a horizontal component of a motion vector associated with a current macroblock being decoded by the decoder by two and truncating the result towards negative infinity is an odd number and if horizontal full pixel motion compensation is to be used by motion compensation unit 3012, or if a value obtained by dividing a horizontal component of the associated motion vector by two and truncating the result towards negative infinity is an even number and if horizontal half pixel motion compensation is to be used by motion compensation unit 3012. If the last column of the interpolated reference block 4015 is to be pre-processed then the conditional pre-processing unit 4006 is configured to average pixel values in the last column of the interpolated reference block 4015 with corresponding pixel values in the second to last column of the interpolated reference block 4015 and storing the average in a corresponding location in the last column of the interpolated reference block 4015. Example pseudo-code for conditionally pre-processing the first column of interpolated reference block 4015 is provided below:

```
If ((int_vec [ 0 ] is odd) && ( half_flag [ 0 ] = = 0 )) ||
   (int_vec [ 0 ] is even) &&
(half_flag [ 0 ] = = 1))
   {
      For all rows m = 0 to h − 1
      {
         ref [ m, w − 1 ] = round ( ( ref [ m, w − 2 ] + ref [ m, w − 1 ] ) / 2 )
      }
   }
``` where "ref" is a buffer that holds interpolated reference block 4015 before pre-processing and processed ref block after pre-processing and m is the $m^{th}$ row of interpolated reference block 4015.

If either the first or last columns or both columns of interpolated reference block 4015 are pre-processed then interpolated reference block 4015 is referred to as processed reference block 4016. If neither of the first or last columns of interpolated reference block 4015 were processed, then processed reference block 4016 is the same as interpolated reference block 4015.

III. e). Example Method

Figure 7A:
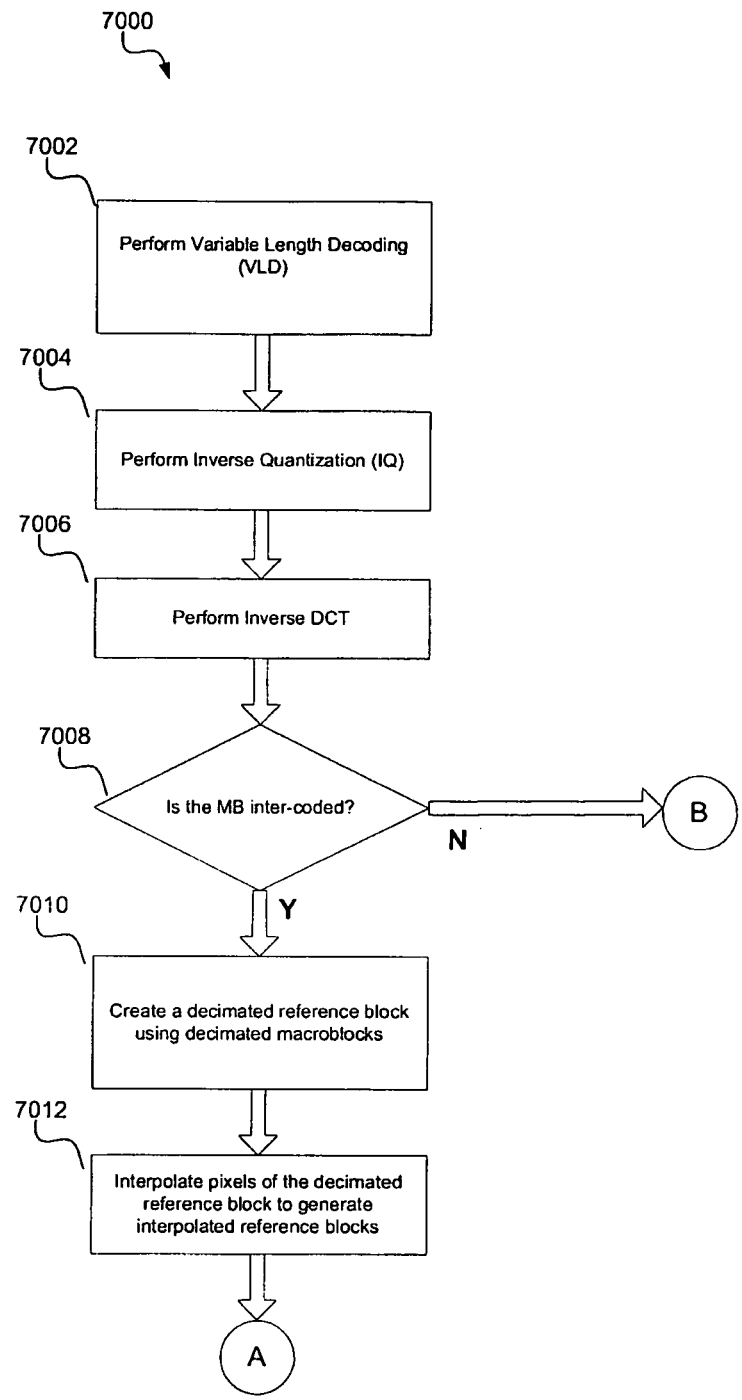
FIGS. 7A-B illustrates an exemplary flowchart showing steps performed according to an embodiment of the invention.
Figure 7B:
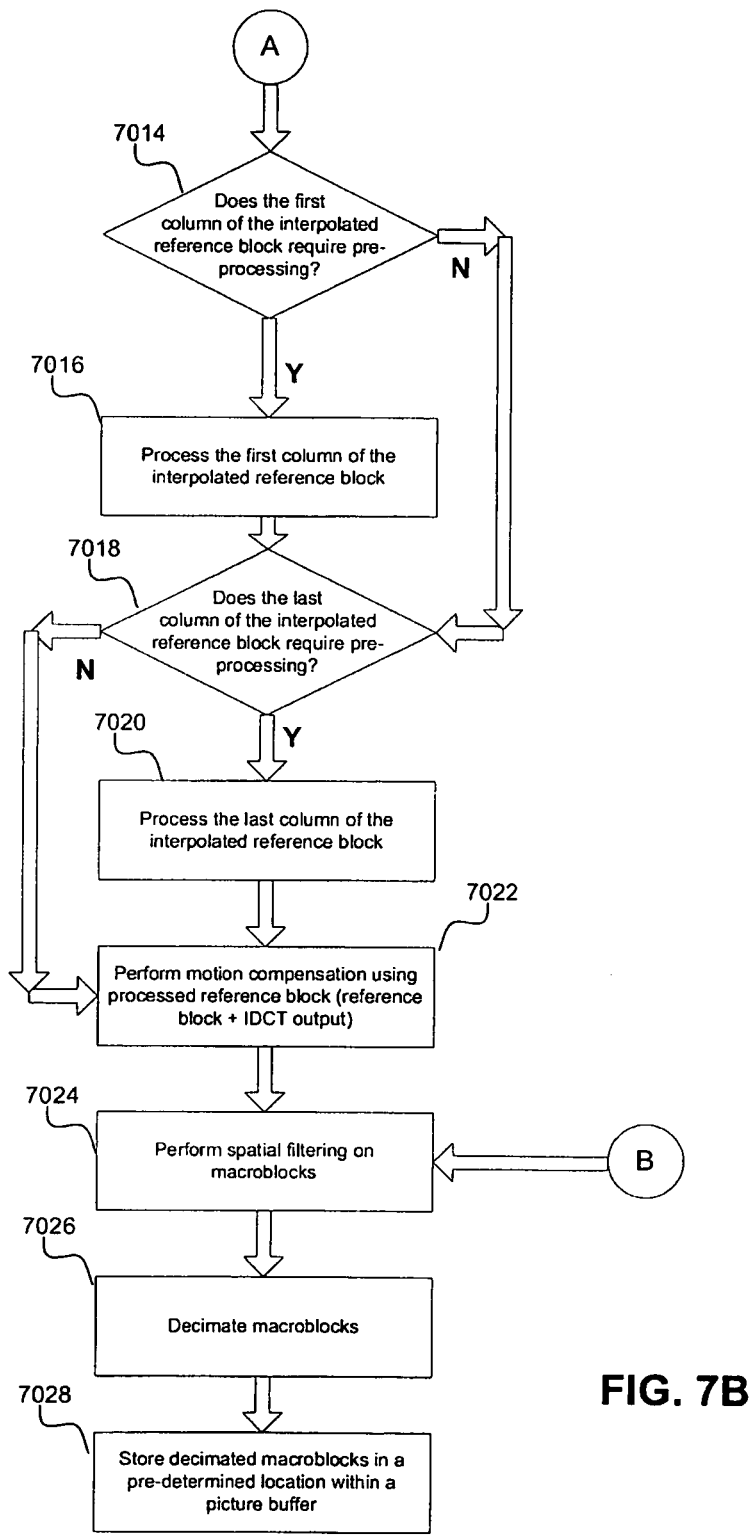

FIGS. 7A-B is an example flowchart 7000 illustrating steps performed to decode a video stream according to an embodiment of the invention. Flowchart 7000 will be described with continued reference to the example operating environment depicted in FIGS. 3-6. However, flowchart is not limited to these embodiments. Note that some steps shown in flowchart 7000 do not necessarily have to occur in the order shown.

In step 7002 a macroblock in an encoded video stream is variable length decoded. For example, an encoded bit stream received and stored in video buffer 3000 provides a macroblock to variable length decoder 3002 which is configured to variable length decode the macroblock and generate variable length decoded data including but not limited to quantized Discrete Cosine Transform (DCT) coefficients.

In step 7004 the quantized DCT coefficients obtained from step 7002 are inverse quantized. For example, inverse quantization unit 3004 is configured to inverse quantize quantized DCT coefficients from step 7002 to generate DCT coefficients.

In step 7006 the DCT coefficients obtained from step 7004 are inverse discrete cosine transformed. For example, inverse discrete cosine transform unit 3006 is configured to perform inverse discrete cosine transformation on the DCT coefficients from step 7004.

In step 7008 it is determined whether the current macroblock being processed is an inter-coded macroblock. An inter-coded or predictively encoded macroblock is a P or B macroblock.

If it is determined in step 7008 that the macroblock is not an inter-coded macroblock then control proceeds to step 7024.

If it is determined in step 7008 that the macroblock is an inter-coded macroblock, then control proceeds to 7010.

In step 7010 a decimated reference block is fetched from a decimated reference picture. For example, pixel interpolation unit 4004 is configured to fetch a decimated reference block 4003 comprising whole or part(s) of previously decoded and decimated macroblocks 4002 stored in frame storage unit 3010.

In step 7012 pixels of the decimated reference block created in step 7010 are interpolated to generate an interpolated reference block. For example, pixel interpolation unit 4004 is configured to interpolate selected pixels of the decimated reference block 4003 created in step 7010 to generate an interpolated reference block 4015.

In step 7014 it is determined whether a first column of the interpolated reference block is to be pre-processed. For example, conditional pre-processing unit 4006 is configured to determine whether a first column of interpolated reference block 4015 is to be pre-processed.

If it is determined in step 7014 that the first column of the interpolated reference block is not to be pre-processed, then control proceeds to step 7018.

If it is determined in step 7014 that the first column of the interpolated reference block is to be pre-processed, then control proceeds to step 7016.

In step 7016 the first column of the interpolated reference block is pre-processed. For example, conditional pre-processing unit 4006 pre-processes the first column of the interpolated reference block.

In step 7018 it is determined whether a last column of the interpolated reference block is to be pre-processed. For example, conditional pre-processing unit 4006 is configured to determine whether a last column of the interpolated reference block from step 7012 is to be pre-processed.

If it is determined in step 7018 that the last column of the interpolated reference block is not to be pre-processed, then control proceeds to step 7022.

If it is determined, in step 7018 that the last column of the interpolated reference block is to be pre-processed, then control proceeds to step 7020.

In step 7020 the last column of the interpolated reference block is pre-processed. For example, conditional pre-processing unit 4006 is configured to pre-process the last column of interpolated reference block 4015 to generate processed reference block 4016.

In step 7022 motion compensation is performed using the processed reference block, IDCT output and decoded macroblock is generated. For example, motion compensation unit 3012 is configured to perform motion compensation using the processed reference block 4016 and output from IDCT unit 3006.

In step 7024 the macroblock is spatially filtered. For example, the macroblock obtained from step 7022 is filtered by filtering and decimation unit 4000. Macroblocks that are not inter-coded as determined in step 7008 are also filtered by filtering and decimation unit 4000.

In step 7026 the macroblock is decimated. For example, the filtered macroblock from step 7024 is decimated by filtering and decimation unit 4000. The macroblock may be decimated by at least a scale of two.

In step 7028, the filtered and decimated macroblock is stored in a pre-determined location within a picture buffer. For example, the filtered and decimated macroblock is stored in frame storage unit 3010.

III. f). Example General Purpose Computer System

The present invention, or portions thereof, can be implemented in hardware, firmware, software, and/or combinations thereof.

Figure 8:
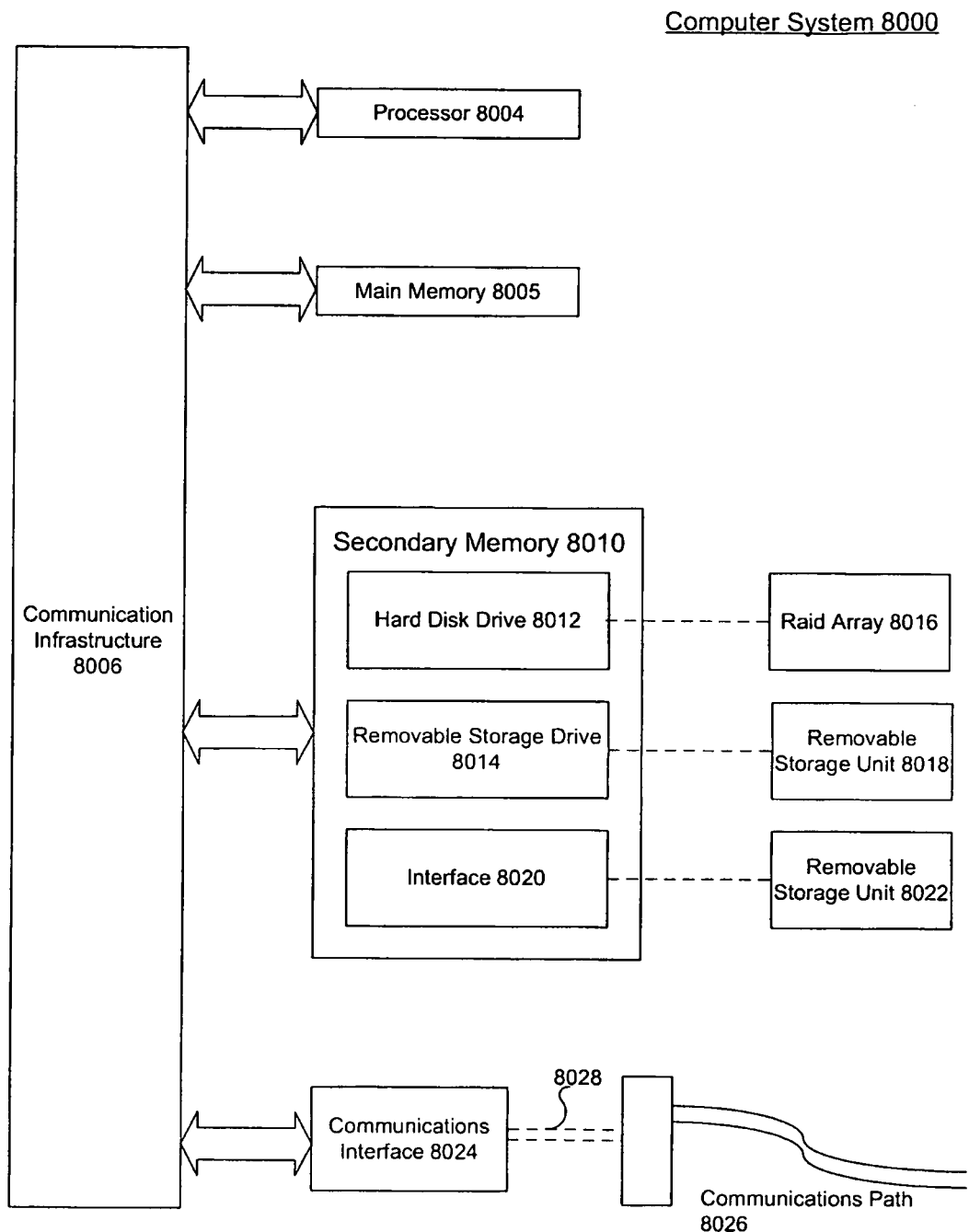
FIG. 8 is a block diagram of an exemplary computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 8000 is shown in FIG. 8. The computer system 8000 includes one or more processors, such as processor 8004. Processor 8004 can be a special purpose or a general purpose digital signal processor. The processor 8004 is connected to a communication infrastructure 8006 (for example, a bus or network). Various software implementations are described in terms of this exemplary computer system. After reading this description, it will become apparent to a person skilled in the relevant art how to implement the invention using other computer systems and/or computer architectures.

Computer system 8000 also includes a main memory 8005, preferably random access memory (RAM), and may also include a secondary memory 8010. The secondary memory 8010 may include, for example, a hard disk drive 8012, and/or a RAID array 8016, and/or a removable storage drive 8014, representing a floppy disk drive, a magnetic tape drive, an optical disk drive, etc. The removable storage drive 814 reads from and/or writes to a removable storage unit 8018 in a well known manner. Removable storage unit 8018, represents a floppy disk, magnetic tape, optical disk, etc. As will be appreciated, the removable storage unit 8018 includes a computer usable storage medium having stored therein computer software and/or data.

In alternative implementations, secondary memory 8010 may include other similar means for allowing computer programs or other instructions to be loaded into computer system 8000. Such means may include, for example, a removable storage unit 8022 and an interface 8020. Examples of such means may include a program cartridge and cartridge interface (such as that found in video game devices), a removable memory chip (such as an EPROM, or PROM) and associated socket, and other removable storage units 8022 and interfaces 8020 which allow software and data to be transferred from the removable storage unit 8022 to computer system 8000.

Computer system 8000 may also include a communications interface 8024. Communications interface 8024 allows software and data to be transferred between computer system 8000 and external devices. Examples of communications interface 8024 may include a modem, a network interface (such as an Ethernet card), a communications port, a PCM-CIA slot and card, etc. Software and data transferred via communications interface 8024 are in the form of signals 8028 which may be electronic, electromagnetic, optical or other signals capable of being received by communications interface 8024. These signals 8028 are provided to communications interface 8024 via a communications path 8026. Communications path 8026 carries signals 8028 and may be implemented using wire or cable, fiber optics, a phone line, a cellular phone link, an RF link and other communications channels.

The terms "computer program medium" and "computer usable medium" are used herein to generally refer to media such as removable storage drive 8014, a hard disk installed in hard disk drive 8012, and signals 8028. These computer program products are means for providing software to computer system 8000.

Computer programs (also called computer control logic) are stored in main memory 8008 and/or secondary memory 8010. Computer programs may also be received via communications interface 8024. Such computer programs, when executed, enable the computer system 8000 to implement the present invention as discussed herein. In particular, the computer programs, when executed, enable the processor 8004 to implement the processes of the present invention. Where the invention is implemented using software, the software may be stored in a computer program product and loaded into computer system 8000 using raid array 8016, removable storage drive 8014, hard drive 8012 or communications interface 8024.

III. g). Example System on Chip

Figure 9:
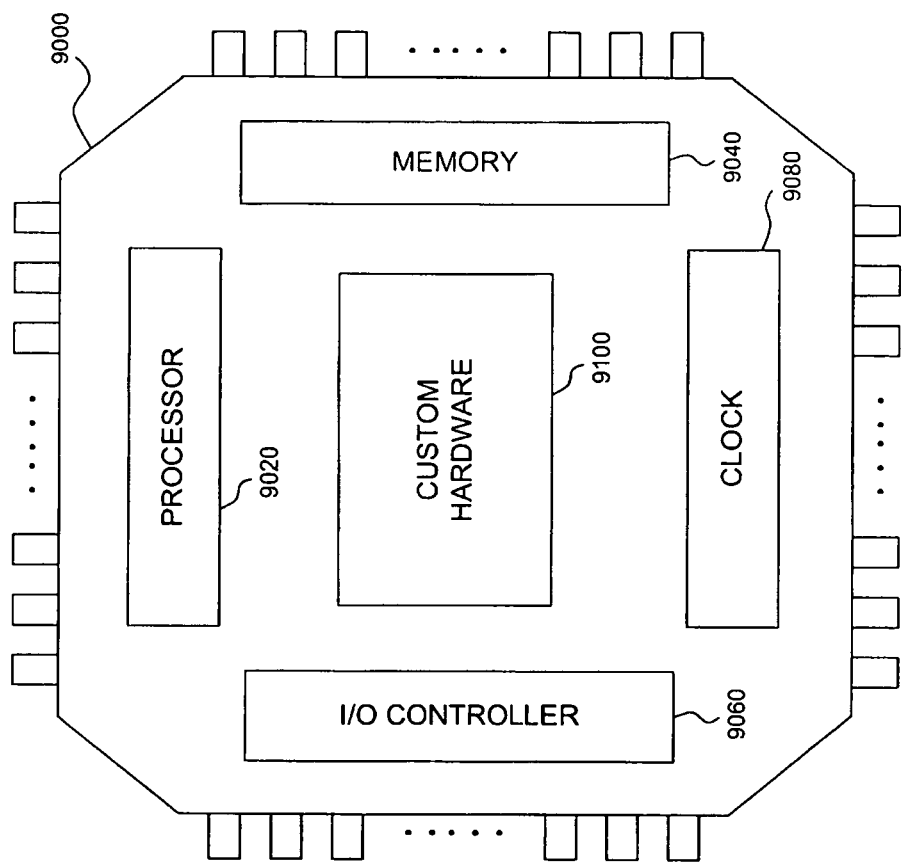
FIG. 9 is a diagram of an example System on Chip (SOC) according to an embodiment of the present invention.

FIG. 9 is a diagram of an example System on Chip (SOC) 9000 according to an embodiment of the present invention. System 9000 includes a processor 9020, a memory 9040, an input/output (I/O) controller 9060, a clock 9080, and custom hardware 9100. In an embodiment, system 9000 is in an application specific integrated circuit (ASIC). System 9000 may include hardwired circuitry or a Digital Signal Processing core in the form of custom hardware 9100 to implement functions of decoder 4014.

Processor 9020 is any processor, for example processor 8004 above, that includes features of the present invention described herein and/or implements a method embodiment of the present invention.

Memory 9040 can be any memory capable of storing instructions and/or data. Memory 9040 can include, for example, random access memory and/or read-only memory. Memory 9040 may be frame storage unit 3010 configured to store decimated macroblocks 4002.

Input/output (I/O) controller 9060 is used to enable components of system 9000 to receive and/or send information to peripheral devices. I/O controller 9060 can include, for example, an analog-to-digital converter and/or a digital-to-analog converter. For example, I/O controller 9060 may be used to receive encoded bit stream 3016 and/or transmit decoded scaled video output 4010.

Clock 9080 is used to determine when sequential subsystems of system 900 change state. For example, each time a clock signal of clock 9080 ticks, state registers of system 9000 capture signals generated by combinatorial logic. In an embodiment, the clock signal of clock 9080 can be varied. The clock signal can also be divided, for example, before it is provided to selected components of system 9000.

Custom hardware 9100 is any hardware added to system 9000 to tailor system 9000 to a specific application. Custom hardware 9100 can include, for example, hardware needed to decode audio and/or video signals, accelerate graphics operations, and/or implement a smart sensor. According to an embodiment of the invention, custom hardware 9100 includes reduced memory decoder 4014 and is enabled to perform functions of decoder 4014. For example, custom hardware 9100 includes video buffer (VB) 3000, variable length decoder (VLD) 3002, inverse quantization (IQ) unit 3004, inverse discrete cosine transform unit (IDCT) 3006, adder 3008, filtering and decimation unit 4000, frame storage unit 3010, scaler 3013, pixel interpolation unit 4004, conditional pre-processing unit 4006 and motion compensation unit 3012. Persons skilled in the relevant arts will understand how to implement custom hardware 9100 to tailor system 9000 to a specific application.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

IV. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method to decode a video stream, comprising:
receiving macroblocks;
filtering and decimating the macroblocks to create decimated macroblocks;
storing the decimated macroblocks;
fetching a decimated reference block comprising whole or part(s) of one or more decimated macroblocks of a stored decimated reference picture;
interpolating selected pixels of the decimated reference block to create an interpolated reference block; and
pre-processing selected columns of the interpolated reference block to create a processed reference block for motion compensation.

2. The method of claim 1, wherein the filtering and decimating step further comprises spatial filtering the macroblocks and decimating one or both of a width and height of the macroblocks by at least half.

3. The method of claim 1, wherein the pre-processing step further comprises determining whether to pre-process the first and last columns of the interpolated reference block.

4. The method of claim 3, further comprising performing the pre-processing step for a first column of the interpolated reference block if a value obtained by dividing a horizontal component of an associated motion vector by two and truncating a result towards negative infinity is an odd number.

5. The method of claim 4, wherein the pre-processing step further comprises averaging pixel values in the first column of the interpolated reference block with corresponding pixel values in a second column of the interpolated reference block and storing the average in a corresponding location in the first column of the interpolated reference block.

6. The method of claim 3, further comprising performing the pre-processing step for a last column of the interpolated reference block if a value obtained by dividing a horizontal component of an associated motion vector by two and truncating a result towards negative infinity is an odd number and if horizontal full pixel motion compensation is to be used or if a value obtained by dividing the horizontal component of the associated motion vector by two and truncating a result towards negative infinity is an even number and if horizontal half pixel motion compensation is to be used.

7. The method of claim 6, wherein the pre-processing step further comprises averaging pixel values in the last column of the interpolated reference block with corresponding pixel values in the second to last column of the interpolated reference block and storing the average in a corresponding location in the last column of the interpolated reference block.

8. The method of claim 1, wherein the fetching, interpolating and pre-processing steps are performed if a received macroblock is an inter-coded or predictively encoded macroblock.

9. A decoder, comprising:
a filtering and decimation unit configured to filter and decimate a macroblock and create a decimated macroblock;
a frame storage unit coupled to the filtering and decimation unit and configured to store the decimated macroblock;
a pixel interpolation unit coupled to the frame storage unit and configured to interpolate selected pixels of a decimated reference block, the decimated reference block comprising whole or part(s) of one or more of the decimated macroblocks of a stored decimated reference picture, to create an interpolated reference block; and
a conditional pre-processing unit coupled to the pixel interpolation unit and configured to pre-process selected columns of the interpolated reference block to create a processed reference block for motion compensation.

10. The decoder of claim 9, wherein the decoder is a Motion Picture Experts Group 2 (MPEG-2) decoder.

11. The decoder of claim 9, wherein the filtering and decimation unit is a filter that is configured to spatially filter and decimate one or both of a width and a height of a macroblock by at least half.

12. The decoder of claim 9, wherein the conditional pre-processing unit is configured to pre-process a first column of the interpolated reference block if a value obtained by dividing a horizontal component of an associated motion vector by two and truncating a result towards negative infinity is an odd number.

13. The decoder of claim 12, wherein the conditional pre-processing unit is configured to average pixel values in the first column of the interpolated reference block with corresponding pixel values in a second column of the interpolated reference block and store the average back in a corresponding location in the first column of the interpolated reference block.

14. The decoder of claim 9, wherein the conditional pre-processing unit is configured to pre-process a last column of the interpolated reference block if a value obtained by dividing a horizontal component of an associated motion vector by two and truncating a result towards negative infinity is an odd number and if horizontal full pixel motion compensation is to be used or if a value obtained by dividing the horizontal component of the associated motion vector by two and truncating the result towards negative infinity is an even number and if horizontal half pixel motion compensation is to be used.

15. The decoder of claim 14, wherein the conditional pre-processing unit is configured to average pixel values in the last column of the interpolated reference block with corresponding pixel values in the second to last column of the interpolated reference block and store the average back in a corresponding location of the last column of the interpolated reference block.

16. The decoder of claim 9, wherein the filtering and decimation unit includes a spatial two-tap low-pass filter.

17. A computer program product comprising a non-transitory computer useable medium including control logic stored therein to decode a video stream, comprising:
first control logic means for causing a computer to filter and decimate macroblocks to create decimated macroblocks;
second control logic means for causing the computer to store the decimated macroblocks;

third control logic means for causing the computer to fetch a decimated reference block comprising whole or part(s) of one or more decimated macroblocks of a stored decimated reference picture;

fourth control logic means for causing the computer to interpolate selected pixels of the decimated reference block to create an interpolated reference block; and fifth control logic means for causing the computer to selectively pre-process selected columns of the interpolated reference block to create a processed reference block for motion compensation.

18. The computer program product of claim 17, wherein the first control logic means further comprises control logic means for causing the computer to perform spatial filtering of the macroblock and decimating one or both of a width and height of the macroblock by at least half.

19. The computer program product of claim 17, wherein the fifth control logic means further comprises control logic means for causing the computer to process a first column of the interpolated reference block if a value obtained by dividing a horizontal component of an associated motion vector by two and truncating a result towards negative infinity is an odd number.

20. The computer program product of claim 19, wherein the fifth control logic means further comprises control logic means for causing the computer to average pixel values in the first column of the interpolated reference block with corresponding pixel values in a second column of the interpolated reference block and store the average back in a corresponding location in the first column of the interpolated reference block.

21. The computer program product of claim 17, wherein the fifth control logic means further comprises control logic means for causing the computer to process a last column of the interpolated reference block if a value obtained by dividing a horizontal component of an associated motion vector by two and truncating a result towards negative infinity is an odd number and if horizontal full pixel motion compensation is to be used or if a value obtained by dividing the horizontal component of an associated motion vector by two and truncating the result towards negative infinity is an even number and if horizontal half pixel motion compensation is to be used.

22. The computer program product of claim 21, wherein the fifth control logic means further comprises control logic means for causing the computer to average pixel values in the last column of the interpolated reference block with corresponding pixel values in the second to last column of the interpolated reference block and store the average back in a corresponding location of the last column of the interpolated reference block.

23. A System on Chip, comprising:
a memory; and
custom hardware, including:
    a filtering and decimation unit coupled to the memory and configured to filter and decimate a macroblock and create a decimated macroblock that is stored in the memory;
    a pixel interpolation unit coupled to the memory and configured to interpolate selected pixels of the decimated reference block, the decimated reference block comprising one or more decimated macroblocks of a decimated stored reference picture, to create an interpolated reference block; and
    a conditional pre-processing unit coupled to the pixel interpolation unit and configured to pre-process selected columns of the interpolated reference block to create a processed reference block for motion compensation.

* * * * *